(12) United States Patent
Oden

(10) Patent No.: US 6,862,282 B1
(45) Date of Patent: Mar. 1, 2005

(54) METHOD AND APPARATUS FOR PACKET ORDERING IN A DATA PROCESSING SYSTEM

(75) Inventor: Robert D. Oden, Raleigh, NC (US)

(73) Assignee: Nortel Networks Limited, Montreal (CA)

( * ) Notice: Subject to any disclaimer, the term of this patent is extended or adjusted under 35 U.S.C. 154(b) by 791 days.

(21) Appl. No.: 09/716,462

(22) Filed: Nov. 21, 2000

Related U.S. Application Data

(60) Provisional application No. 60/228,463, filed on Aug. 29, 2000.

(51) Int. Cl.[7] .............................................. H04L 12/56
(52) U.S. Cl. ...................................... 370/394; 370/412
(58) Field of Search ............................... 370/394, 412; 709/201

(56) References Cited

U.S. PATENT DOCUMENTS

| | | | | |
|---|---|---|---|---|
| 5,617,561 A | * | 4/1997 | Blaauw et al. ................. | 703/26 |
| 6,147,996 A | * | 11/2000 | Laor et al. .................... | 370/394 |
| 6,226,687 B1 | * | 5/2001 | Harriman et al. ............ | 709/246 |
| 6,327,625 B1 | * | 12/2001 | Wang et al. ................. | 709/235 |
| 6,351,454 B1 | * | 2/2002 | Crocker et al. .............. | 370/235 |
| 6,434,145 B1 | * | 8/2002 | Opsasnick et al. ........... | 370/394 |
| 6,601,150 B1 | * | 7/2003 | Scheinbart et al. .......... | 711/156 |
| 6,633,575 B1 | * | 10/2003 | Koodli ........................ | 370/412 |
| 6,661,794 B1 | * | 12/2003 | Wolrich et al. .............. | 370/394 |

* cited by examiner

*Primary Examiner*—Min Jung
(74) *Attorney, Agent, or Firm*—Dinesh Agarwal, P.C.

(57) ABSTRACT

A method and system for packet ordering in a multi-processor data processing system. The multi-processor system comprises an input queue, packet memory for storing the data packets, a series of packet processors with on-chip memory, an output queue, and an ordering buffer. The ordering buffer is provided to maintain strict packet order in the multi-processor system, where the packets are buffered in on-chip memory, but are not necessarily processed in order. The ordering buffer holds a pointer and completion flag for each packet being processed or already processed but not released to the output queue. The ordering buffer allows the data packets to be read from the on-chip memory in the packet processors regardless of the order in which the data packets are processed. A processed data packet is released to the output queue in order once the processing of earlier packets is completed.

11 Claims, 4 Drawing Sheets

METHOD AND APPARATUS FOR PACKET ORDERING IN A DATA PROCESSING SYSTEM

This applications claims benefit of U.S. Ser. No. 60/228,463 filed Aug. 29, 2000.

FIELD OF THE INVENTION

This invention relates to data processing systems, and more particularly to a method and system for ordering packets in a multi-processor system.

BACKGROUND OF THE INVENTION

Network processing at multi-gigabit data rates, for example at oc-192 or higher data rates, requires multiple multi-threaded processors. The number of processors in a multi-processor system is limited by current integrated circuit technology. Network processing at multi-gigabit data rates requires packet buffering to be done internal to the network processor. The amount of embedded memory is also limited by current integrated circuit technology. In order to properly process multiple packets in a multi-processor system, strict packet ordering between the incoming and outgoing packet path must be maintained. The problem is to maximize the number of processors and minimize the number of packet buffers required while ensuring strict packet order.

A number of approaches to this problem have been attempted in the art. One approach involves removing packets from the processors in the order of completion. The packets are buffered until processing of the earlier packets is completed. This approach suffers from a number of drawbacks, which include increased internal memory requirements, increased routing resource requirements, and additional operations to move data.

A second approach known in the art involves allowing packets to remain in processor memory until processing of the earlier packets is completed. This approach also suffers from a number of drawbacks which include increased internal memory requirements, increased packet routing resource requirements, and the problem of processor stalling and/or thread stalling while waiting for the earlier packets to be processed.

Accordingly, there remains a need for a solution, which addresses the shortcomings and improves on the known approaches.

SUMMARY OF THE INVENTION

The present invention provides a method and system for packet ordering in a multi-processor data processing system.

According to one aspect of the invention, an ordering buffer is provided to maintain strict packet order in an environment where packets are not necessarily processed in order, and the buffering of packets occurs in on-chip processor memory. The ordering buffer contains a pointer and completion flag for each packet being processed or already processed but not released for output. The ordering buffer allows packet data to be read from the processor memory regardless of the completion order of processing the packet. A packet is released for output in order when the processing of earlier packets has been completed.

Advantageously, processing of subsequent packets continues even if the processing of an earlier packet has not completed. The number of packets that can be processed ahead of an earlier packet is only limited by the number of entries in the ordering buffer.

The present invention provides an approach, which does not require additional memory to buffer completed packets while waiting for an earlier packet to complete.

In a first aspect, the present invention provides a system for processing multiple incoming data packets and outgoing data packets in a multi-processor data processing system, the system comprises: (a) means for inputting each of the incoming data packets in a specific order and means for assigning an ordering pointer to each of the packets of data, the ordering pointers being stored in an ordering buffer; (b) means for processing the incoming data packets; (c) means for setting a completion flag upon completion of processing of the associated incoming packet, and said completion flag being stored in said ordering buffer with the ordering pointer associated with said incoming data packet; (d) means for outputting the data packets after the associated completion flags have been set, the means for outputting being responsive to the ordering pointers associated with the incoming data packets so that the specific order of the incoming packets is maintained.

In another aspect, the present invention provides a method for processing multiple incoming data packets and outgoing packets in a multi-processor data processing system, the method comprises the steps of: (a) inputting each of the incoming data packets in a specific order and assigning an ordering pointer; (b) processing each of the incoming data packets; (c) setting a completion flag for each of the incoming data packets upon completion of processing of the associated incoming packet; (d) outputting the processed incoming data packets after the associated completion flags have been set, the processed incoming packets being outputted based on the ordering pointers associated with the incoming packets so that the specific order is maintained.

In a further aspect, the present invention provides a network processor for processing multiple incoming data packets and outgoing packets in a data processing system, the system comprises: (a) an input component for inputting each of the incoming data packets in a specific order and a component for assigning an ordering pointer to each of the incoming data packets, the ordering pointers being stored in an ordering buffer; (b) one or more processor components for processing the incoming data packets; (c) a component for setting a completion flag upon completion of processing of the associated incoming packet, and the completion flag being stored in the ordering buffer with the ordering pointer associated with the incoming data packet; (d) an output component for outputting the processed incoming packets after the associated completion flags have been set, the output component being responsive to the ordering pointers associated with the incoming packets so that the specific order of the incoming packets is maintained for the output.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, a preferred embodiment of the present invention, and in which.

DESCRIPTION OF THE PREFERRED EMBODIMENT

As shown in the accompanying FIGS. 1 to 4, the system according to the present invention is directed to a multi-processor system.

Figure 1:
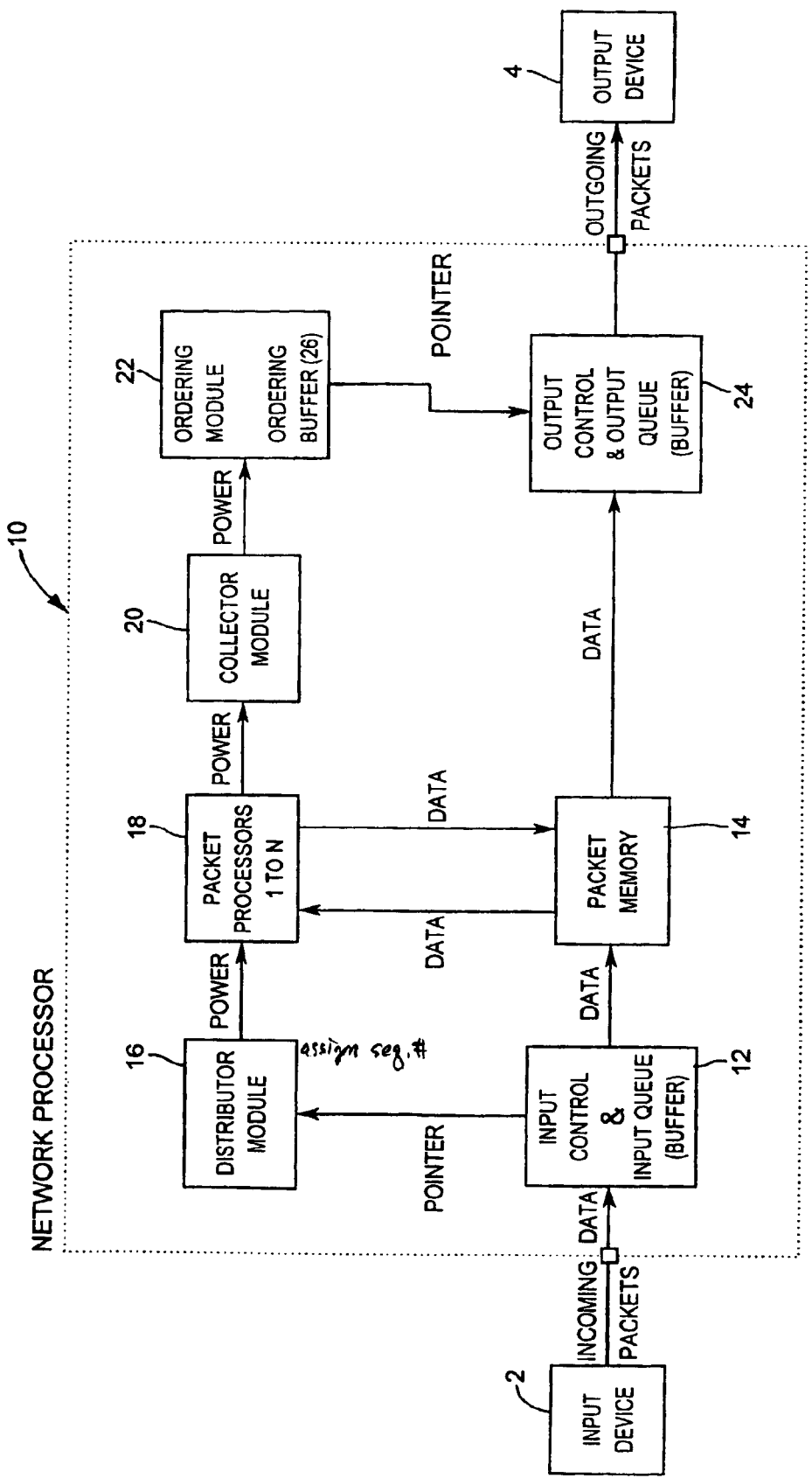
FIG. 1 shows in block diagram form a multi-processor network processor according to the present invention.

Reference is first made to FIG. 1, which shows in diagrammatic form a multi-processor or pipeline network processor according to one aspect of the present invention. The network processor is indicated generally by reference 10. As shown in FIG. 1, the network processor 10 receives incoming packets from an input device 2. The network processor 10 processes the incoming packets (i.e. data) and outputs outgoing packets, which are transmitted to an output device denoted generally by reference 4. The network processor 10 finds widespread application as will be apparent to those skilled in the art. For example, the incoming device 2 may comprise a POS-PHY physical device or HDIC controller and the outgoing device 4 may comprise a router switch fabric. In another application for the processor 10, the incoming device 2 comprises a router switch fabric and the outgoing device 4 comprises a POS-PHY physical layer device.

As shown in FIG. 1, the network processor 10 according to the invention comprises an input control and input queue module 12, a packet memory module 14, a distributor module 16, a series of packet processors (1 to N) denoted generally by reference 18, a collector module 20, an ordering module 22, and an output control and output queue module 24. The ordering module 22 includes an ordering buffer 26 (FIG. 2) according to the invention. The ordering module 22 controls the operation of the ordering buffer 26 as described in more detail below.

Figure 2:
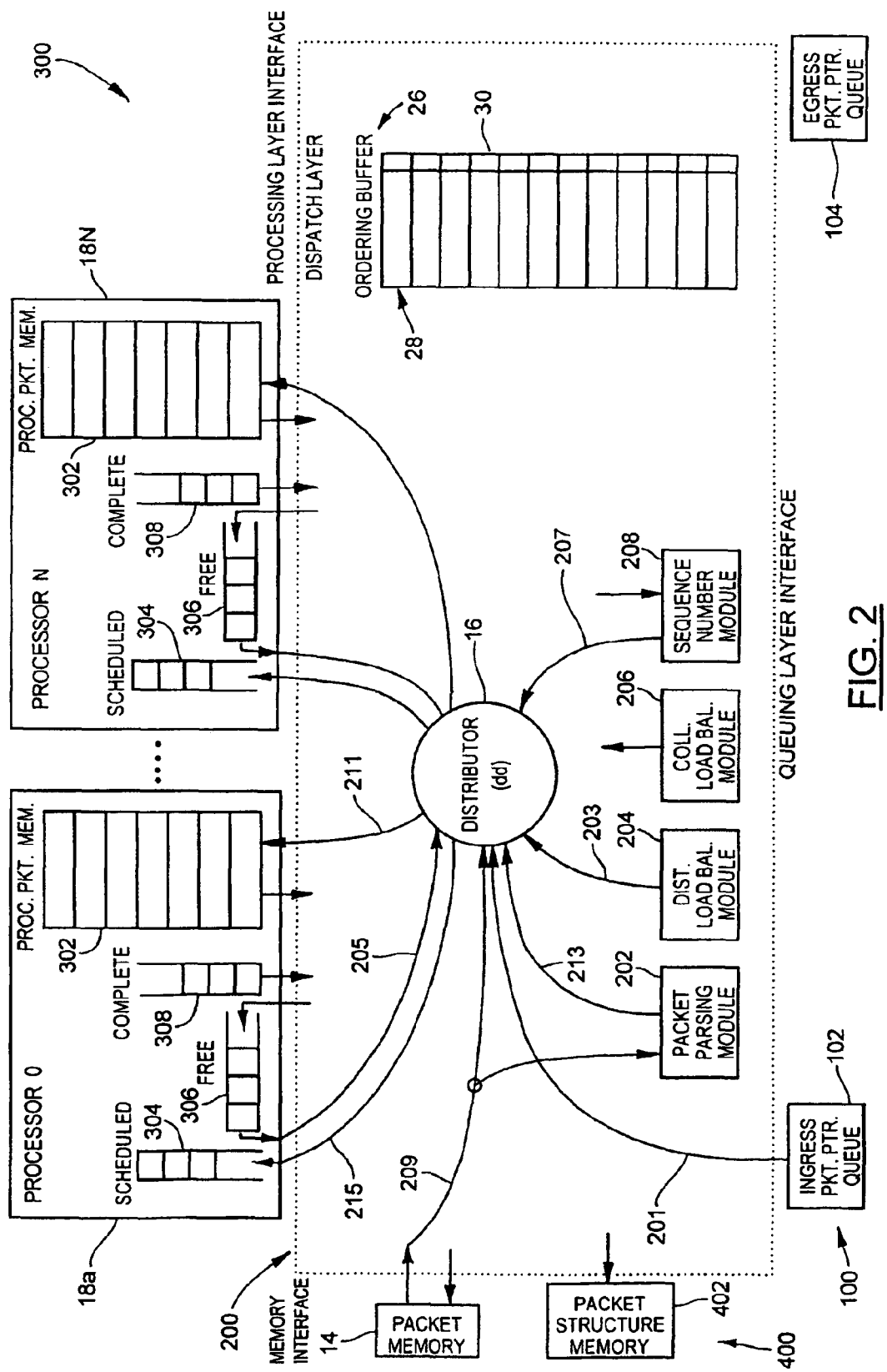
FIG. 2 shows in diagrammatic form operation of a distributor control module in a multi-processor environment according to the present invention.

The ordering buffer 26 as shown in FIG. 2 comprises a contiguous number of memory locations or registers 28, shown individually as 28a, 28b to 28m. Each of the registers 28 stores a pointer which references the location of the data packet in the packet memory 14. Each of the memory locations or registers 28 also includes a register 30 for storing a complete flag which is associated with the data packet referenced by the pointer.

The pointers are written into the ordering buffer 26 and the complete flag is set in the order the processing of data packets is completed by individual packet processors 18. The location 28 of the pointer in the ordering buffer 26 is based on a sequence number. The distributor module 16 assigns a sequence number to the data packet when the packet is de-queued from the incoming queue or buffer 12 (i.e. by the distributor module 16). The pointers stored in the ordering buffer 26 are then en-queued onto the outgoing queue or buffer 24 in sequential order after the complete flag is set for the associated data packet. It will be understood that each sequence number corresponds to a single entry in the ordering, buffer 26, and that a sequence number can only be used by one data packet at a time. When the incoming data packet is de-queued from the input queue 12, the packet is assigned a sequence number. When the processed data packet is en-queued onto the output queue or buffer 24, the sequence number is released into a pool of unassigned sequence numbers.

Figure 3:
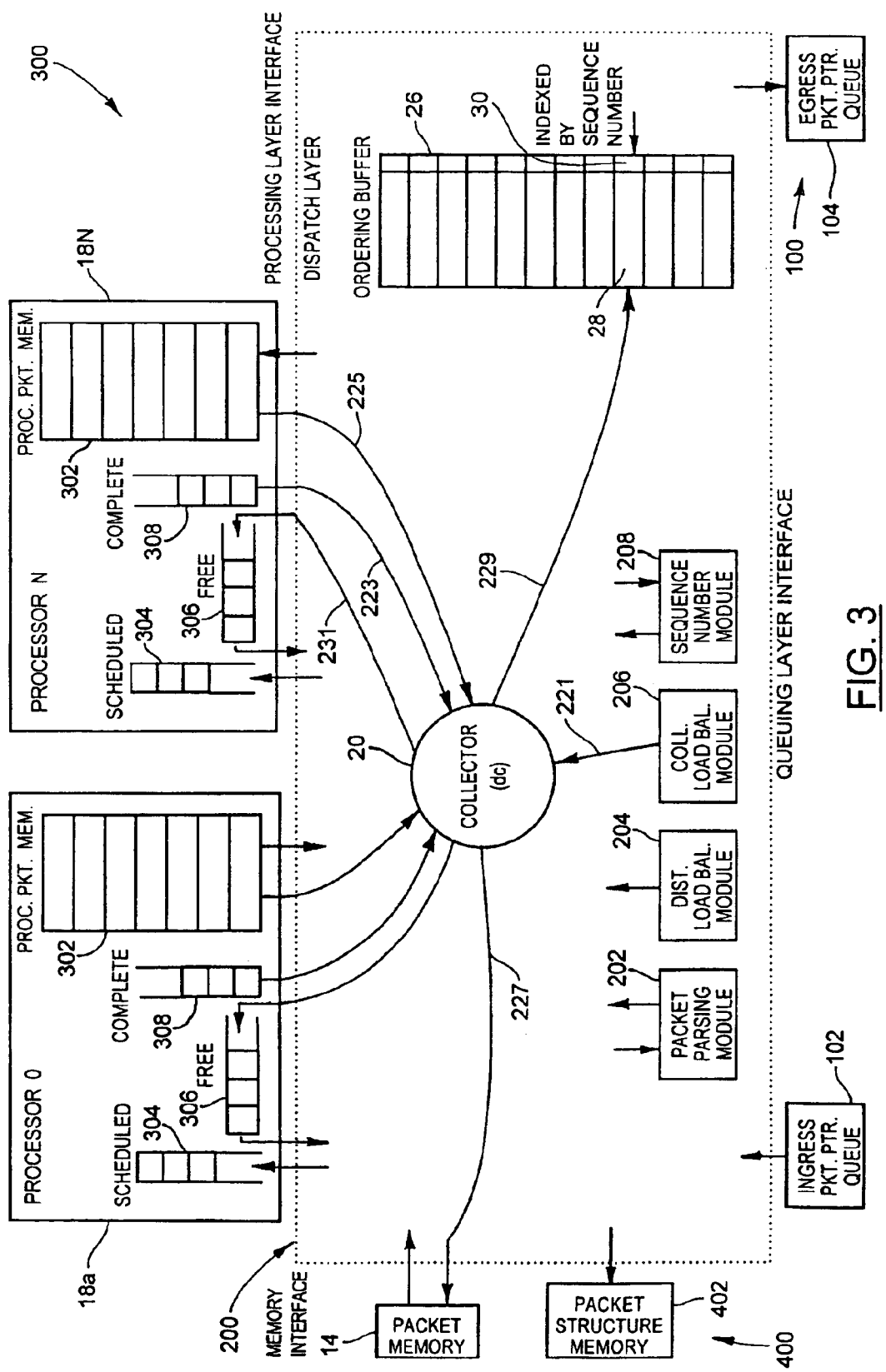
FIG. 3 shows in diagrammatic form operation of a collector control module in a multi-processor environment according to the present invention.
Figure 4:
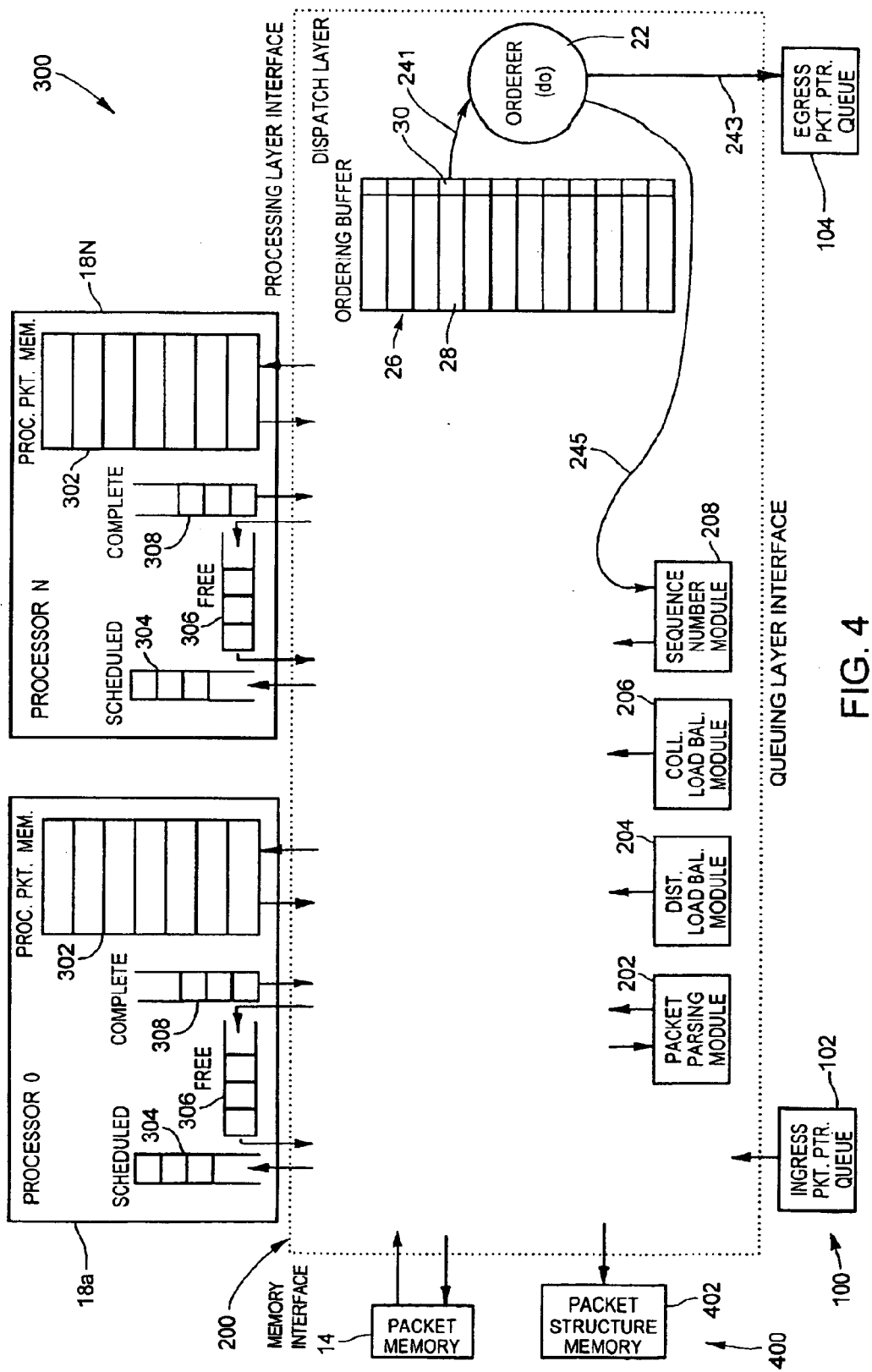
FIG. 4 shows in diagrammatic form operation of an ordering module in a multi-processor environment according to the present invention.

The operation of the network processor 10 with the ordering module 24 and the ordering buffer 26 is now described with reference to FIGS. 2 to 4. In FIGS. 2 to 4, the network processor 10 is depicted, and the operation, described in terms of a queuing layer interface 100, a dispatch layer 200, a processing layer interface 300, and a memory interface 400.

The queuing layer interface 100 comprises an input data packet pointer queue 102 and output packet pointer queue 104.

The dispatch layer 200 in the network processor 10 comprises the ordering buffer 26 (as described above), a packet parsing module 202, a distributed load balancing module 204, a collection load balancing module 206, and a sequence number module 208.

The processing layer interface 300 comprises the packet processors 18a to 18N. As shown each of the packet processors 18 comprises a processor packet memory 302, a scheduled pointer queue 304, a free pointer queue 306, and a completed pointer queue 308.

The memory interface 400 comprises the packet memory 14. The interface 400 also includes a packet structure memory 402.

Reference is made to FIG. 2, which depicts the operation of the distributor module 16 (FIG. 1), and packet data write and packet statistics write operations. The distributor module 16 de-queues the packet pointer for the data packet from the input queue or buffer 12. The distributor module 16 then assigns the data packet a sequence number and copies the data packet into the processor memory 14 for processing by the packet processors 18.

Referring to FIG. 2, the distributor control module 16 de-queues the packet memory pointer from the input packet pointer queue 102 as indicated by path 201. The distributor module 16 selects one of the packet processors 18 based on load balancing as determined from the load balancing module 204 as indicated by path 203. Next, the distributor module 16 de-queues a pointer for the processor packet memory 302 as indicated by path 205. The pointer is de-queued from the free pointer queue 306 in the selected packet processor 18a. The distributor module 16 then assigns the data packet a sequence number which is obtained from the sequence number module 208 as indicated by path 207. The sequence number module 208 provides a pool of sequence numbers.

Next, the distributor module 16 performs a packet data write operation. The packet data write operation involves reading the data packet from the packet memory 14, as indicated by path 209, and writing the data packet into the processor packet memory 302 as indicated by path 211 in FIG. 2.

The distributor module 16 next performs a packet statistics write operation. The packet statistics write operation involves writing a packet memory pointer and the sequence number into one of the registers 28, 30 in the ordering buffer 26 as also indicated by path 211. The packet statistics are also written into the processor packet memory 302 as indicated by paths 211 and 213. Next, the distributor module 16 en-queues the processor packet memory pointer into the scheduled pointer queue 304, as indicated by path 215 in FIG. 2.

Reference is made to FIG. 3, which depicts the operation of the collector module 20 (FIG. 1), and the packet statistics read, packet data read, and packet completion indication operations. In general terms, the collector module 20 copies the processed packet data out of the processor packet memory 302 and into the packet memory 14. The collector module 20 writes the packet pointer into the ordering buffer 26 at the address 28 set by the sequence number and the complete flag is also set in the register 30.

Referring to FIG. 3, the collector module 20 determines the packet processor 18 by reading the collection load balancing module 206, as indicated by path 221. The collector module 20 then de-queues a pointer for the processor packet memory 302 of the selected packet processor 18N, as indicated by path 223. The pointer is de-queued from the free pointer queue 306 in the selected packet processor 18N.

For the packet statistics read operation, the collector module 20 reads the packet memory pointer, the sequence number, and a DMA (Direct Memory Access) command from the processor packet memory 302 as indicated by path 225 in FIG. 3.

For the packet data read operation, the collector module 20 transfers the packet data from the processor packet memory 302 in the packet processor 18N to the packet memory 14, as indicated by paths 225 and 227 in FIG. 3.

For the packet completion indication operation, the collector module 20 first writes the packet memory pointer for the data packet into register 28 in the ordering buffer 26 which is indexed by the sequence number as indicated by path 229. The sequence number was assigned to the data packet (as described above for FIG. 2). Next, the collector module 20 en-queues the freed pointer for the processor packet memory 302 on the free pointer queue 306, as indicated by path 231.

Reference is next made to FIG. 4, which depicts the operation of the ordering module 22 (FIG. 1), and the packet egress ordering operation. As will be described in more detail, the ordering module 22 walks the ordering buffer 26 in sequence. The ordering module 22 en-queues a packet pointer onto the output queue 104 only if the complete flag has been set. Once a packet pointer is en-queued, the ordering module 22 clears the complete flag, releases the sequence number for use by another incoming packet and the complete flag for the next entry is tested. When the ordering module 22 completes the last entry in the ordering buffer 26, the ordering module 22 moves back to the first entry in the ordering buffer 26 and the process is repeated.

Referring to FIG. 4, the ordering module 22 first increments an internal addressing counter and waits for the complete flag to be set in the register 30 in the ordering buffer 26, as indicated by path 241. Next, the ordering module 22 en-queues the pointer (i.e. the packet pointer) for the data packet on the output packet pointer queue 104, as indicated by path 243. The ordering module 22 also clear the complete flag in the register 30 of the ordering buffer 26. The ordering module 22 then returns the sequence number used for this packet to the sequence number module 208, as indicated by path 245 in FIG. 4.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for processing multiple incoming packets of data and outgoing packets in a multi-processor data processing system, said system comprising:

(a) means for inputting each of said incoming data packets in a specific order and means for assigning an ordering pointer to each of said packets of data, said ordering pointers being stored in an ordering buffer;

(b) means for processing said incoming packets of data;

(c) means for setting a completion flag upon completion of processing of said associated incoming packet, and said completion flag being stored in said ordering buffer with the ordering pointer associated with said incoming packet;

(d) means for outputting said processed data packets after said associated completion flags have been set, said means for outputting being responsive to the ordering pointers associated with said incoming data packets so that said specific order of the incoming packets is maintained;

wherein said means for inputting each of said incoming data packets in a specific order includes means for assigning a plurality of sequence numbers defining a sequential order, said incoming packets being assigned a sequence number in said sequential order according to the order of input from an incoming queue, and each of said sequence numbers providing an index to the location of the associated ordering pointer in said ordering buffer.

2. The system as claimed in claim 1, wherein said means for outputting said processed data packets includes means for en-queuing the processed data packets on an outgoing queue in order according to said sequence numbers in response to the completion flags being set for the processed data packets.

3. The system as claimed in claim 2, wherein said means for assigning a plurality of sequence numbers further includes means for recovering sequence numbers previously assigned to said processed data packets en-queued on said outgoing queue, and said recovered sequence numbers being made available for assignment to other incoming data packets.

4. The system as claimed in claim 3, wherein said sequence numbers and said recovered sequence numbers comprise a pool of sequence numbers defining the locations of the ordering pointers for said ordering buffer.

5. A method for processing multiple incoming packets of data and outgoing packets in a multi-processor data processing system, said method comprising the steps of:

(a) inputting each of said incoming data packets in a specific order and assigning an ordering pointer to each of said incoming data packets;

(b) processing each of said incoming data packets;

(c) setting a completion flag for each of said incoming data packets upon completion of processing of said associated incoming data packet;

(d) outputting said processed incoming data packets after said associated completion flags have been set, said processed incoming data packets being outputted based on the ordering pointers associated with said incoming data packets so that said specific order is maintained;

wherein said step of inputting each of said incoming data packets in a specific order comprises assigning a sequence number to each of said incoming data packets, said sequence numbers defining a sequential order, said incoming packets being assigned a sequence number according to the order of input, and each of said sequence numbers providing an index to the location of the associated ordering pointer in an ordering buffer.

6. The method as claimed in claim 5, wherein said step for outputting said processed incoming data packets comprises en-queuing the processed data packets on an outgoing queue in the order of said sequence numbers in response to the completion flags being set for the processed incoming data packets.

7. The method as claimed in claim 6, further including the step of recovering the sequence numbers previously assigned to the processed incoming data packets en-queued on said outgoing queue, and said recovered sequence numbers being made available for assignment to other incoming data packets.

8. A network processor for processing multiple incoming data packets and outgoing data packets in a data processing system, said network processor comprising:

(a) an input component for inputting each of said incoming data packets in a specific order and a component for assigning an ordering pointer to each of said incoming data packets, and said ordering pointers being located in an ordering buffer;

(b) a plurality of packet processor components for processing said inputted incoming data packets;

(c) a component for setting a completion flag for each of said incoming data packets upon completion of processing of said incoming data packet;

(d) an output component for outputting said processed incoming data packets after said associated completion flags have been set, said output component being responsive to the order in said ordering buffer of the ordering pointers associated with said incoming data packets so that said specific order of the incoming data packets is maintained;

wherein said input component for inputting each of said incoming data packets includes a component for assigning a plurality of sequence numbers defining a sequential order, said incoming packets being assigned a sequence number in said sequential order according to the order of input from an incoming queue, and each of said sequence numbers providing an index to the location of the associated ordering pointer in said ordering buffer.

9. The network processor as claimed in claim 8, wherein said output component includes a component for en-queuing the processed data packets on an outgoing queue in the order of said sequence numbers in response to the completion flags being set for the processed data packets.

10. The network processor as claimed in claim 9, wherein component for assigning a plurality of sequence numbers further includes a component for recovering sequence number previously assigned to said processed data packets en-queued on said outing queue, and said recovered sequence numbers being made available for assignment to other incoming data packets.

11. The network processor as claimed in claim 10, wherein said sequence numbers and said recovered sequence numbers comprise a pool of sequence numbers defining the locations of the ordering pointers for said ordering buffer.

\* \* \* \* \*